Figure 7:
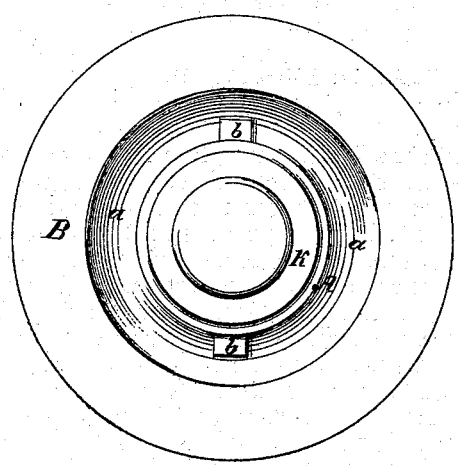

S. T. F. STERICK. 2 Sheets: Sheet 1.
Improvement in Metallic Hubs for Vehicle Wheels.
No. 125,095. Patented March 26, 1872.
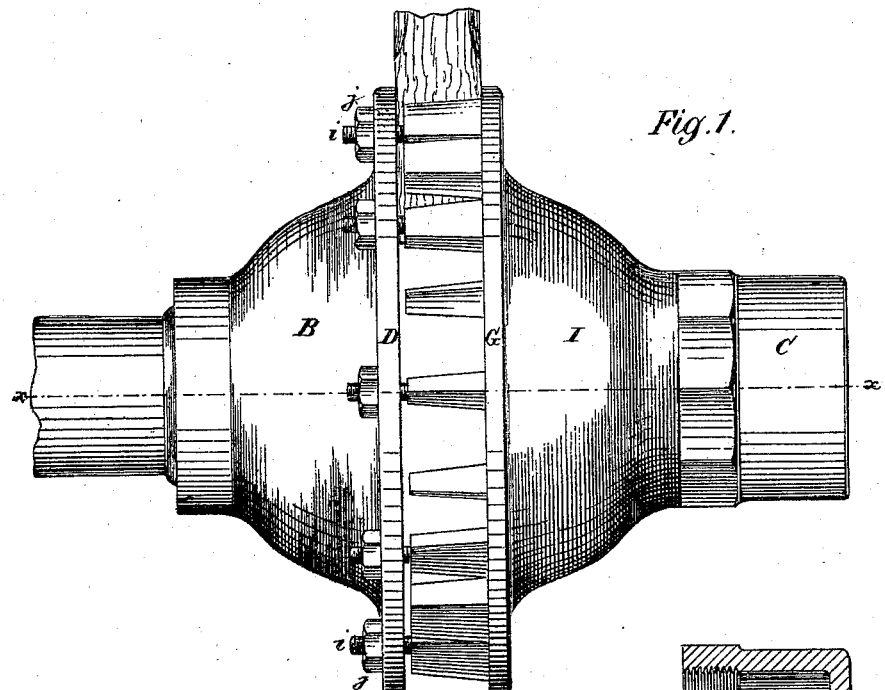
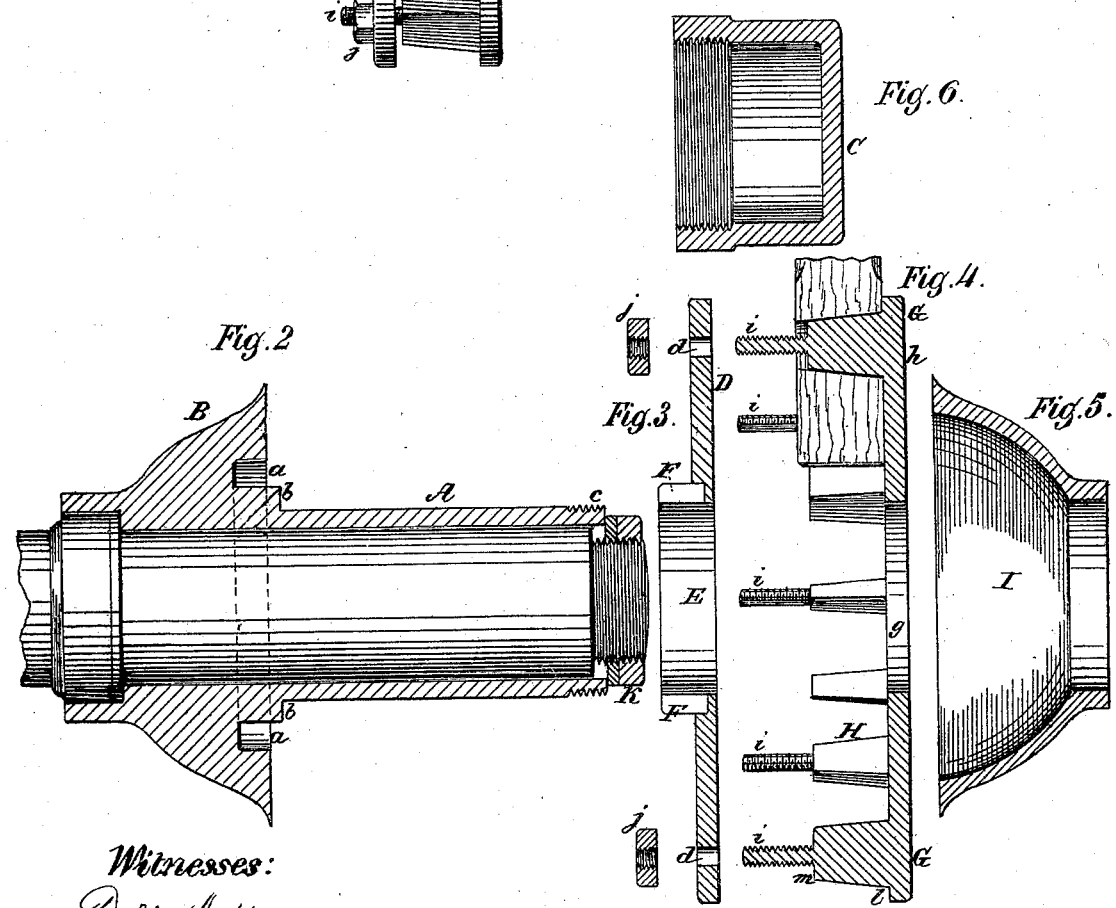
Witnesses:
Fredk. Artos
A. H. Norris.
Inventor:
Sylvester T. F. Sterick.
By James L. Norris
Atty.

S. T. F. STERICK. 2 Sheets: Sheet 2.
Improvement in Metallic Hubs for Vehicle Wheels.
No. 125,095. Patented March 26, 1872.

Witnesses:
Fredk. Artos
A. H. Norris

Inventor:
Sylvester T. F. Sterick.
By James L. Norris
Atty

UNITED STATES PATENT OFFICE.

SYLVESTER T. F. STERICK, OF GEORGETOWN, DISTRICT OF COLUMBIA.

IMPROVEMENT IN METALLIC HUBS FOR VEHICLE-WHEELS.

Specification forming part of Letters Patent No. 125,095, dated March 26, 1872.

*To all whom it may concern:*

Be it known that I, SYLVESTER T. F. STERICK, of Georgetown, District of Columbia, have invented a new and useful Improvement in Metallic Hubs for Vehicles, of which the following is a specification:

This invention has for its object to produce a metallic hub for wagons and other vehicles, which will be cheap in construction, durable, and symmetrical in form, the several parts composing the hub being so formed that when brought together a compact, strong, neat, and attractive hub is obtained. My invention consists, among other things, first, in forming the pipe or axle box with a disk, having upon its front face an annular groove and a stud, into which groove fits an annular flange arranged on a movable disk, having a recess formed in it of a size sufficient to pass over said stud in such a manner that, when the movable disk is properly adjusted in position upon the axle-box in respect to the disk formed thereon, it will be prevented from rotating, and the two disks form the rear portion of the hub; second, the invention consists in forming upon a metallic disk a series of diamond-shaped wedges in such a manner that when the tenons of the spokes are grooved or recessed, so as to fit between either two of the diamond-shaped wedges, they will be held rigidly in place, prevented from being radially withdrawn, and free from lateral movement, owing to the wedge-shaped bearing or binding surface; third, the invention consists in providing a carriage or other wheel hub with diamond-shaped wedges, so as to receive spokes having their tenons correspondingly formed, the wedges and spokes constructed as hereinafter described, so when the spokes become loosened in usage and other causes due to contraction, &c., they can be subjected to lateral pressure and be retightened with facility; fourth, the invention consists in forming with the diamond-shaped wedges projecting lugs, having screw-threads, which pass through openings formed in the movable disk, by which means the two disks are connected together and the spokes confined in place; fifth, the invention consists of the combination of two metallic disks arranged so as to be connected together by screw-bolts and nuts, one of said disks being formed with diamond-shaped wedges to receive the spokes, while the other disk is formed with a smooth plane bearing-surface for the edges of the spokes to abut against, the two disks arranged to slide off and on the axle for the purpose of forming the wheel or removing injured spokes and replacing new ones; sixth, the invention consists in providing hubs of wheels with diamond-shaped wedges for receiving and locking in place the spokes, gradually decreasing in size from their base to their tops, so as to form a slight incline, whereby each spoke, when arranged in position and subjected to pressure, is bound or wedged firmly on four edges. The spoke, being of a corresponding form, but larger than the space for its reception, prevents the rear movable disk from coming in contact with the edges of the diamond-shaped wedges, there always remaining a slight projection of the spokes beyond the edge of the diamond-shaped wedges, whereby the uniform tightening of the spokes is effected; seventh part of my invention consists of a combination of parts.

Figure 8:
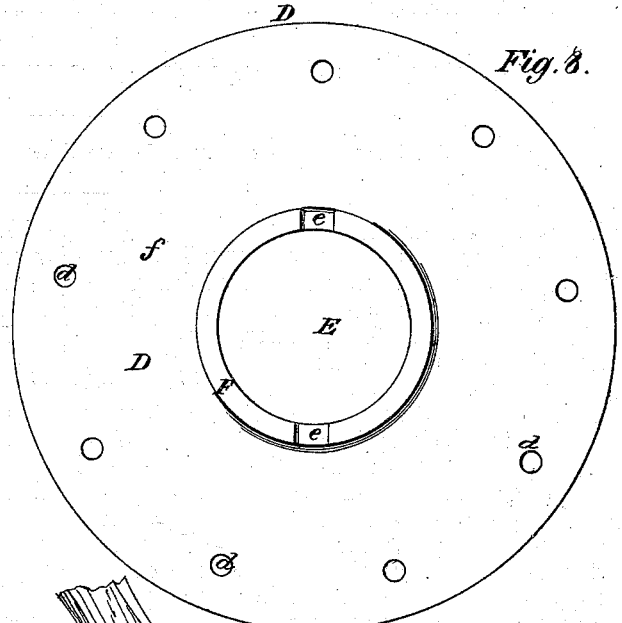
Figure 9:
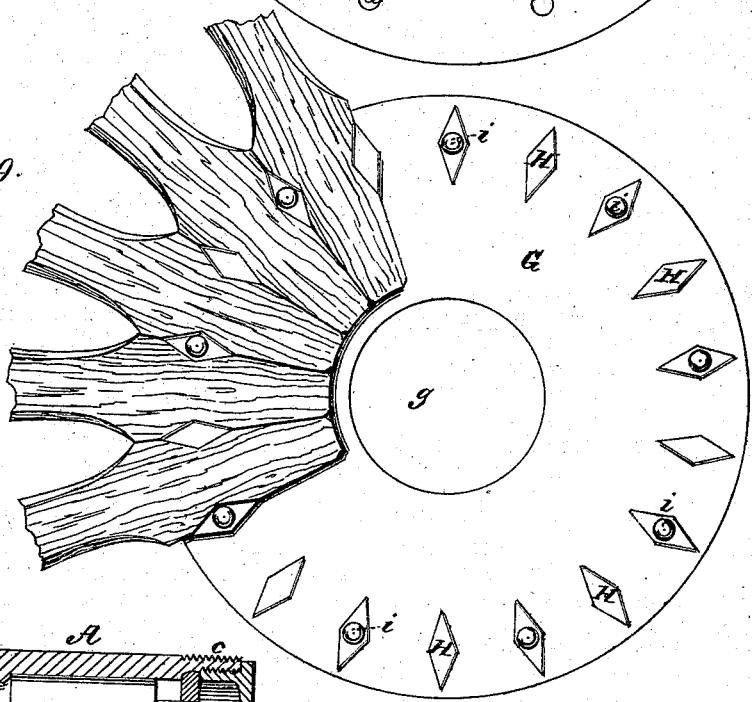
Figure 10:
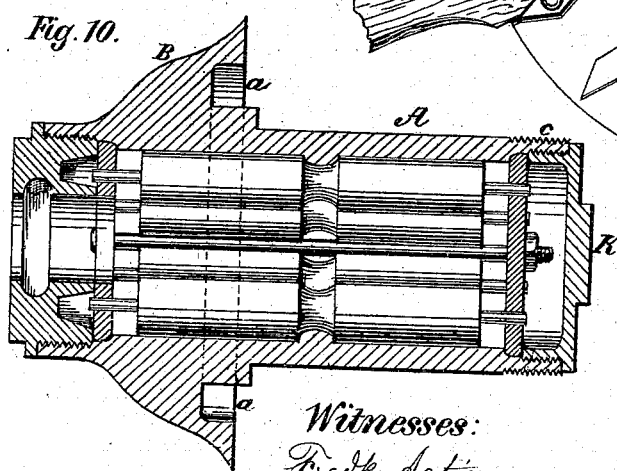

In the drawing, Figure 1 is a side view of the metallic hub for wagons, &c., complete. Fig. 2 is a longitudinal central section of the pipe or axle box with its rear disk, showing the journal of an axle arranged therein. Fig. 3 is a vertical central section of the rear movable disk. Fig. 4 is a similar view, the disk carrying the diamond-shaped wedges. Fig. 5 is a similar view of the movable front cap forming the front portion of the hub. Fig. 6 is a similar view of the confining-cap or axle-box nut. Fig. 7 is a top view of the disk formed on the pipe-box, showing the annular groove and locking-stud. Fig. 8 is a similar view of the rear movable disk, showing the annular flange and recess to receive the locking-stud. Fig. 9 is a face view of the disk carrying the diamond-shaped wedges, showing the manner of arranging the spokes in place. Fig. 10 is a longitudinal central section of the pipe or axle box formed with the rear disk, showing the manner of applying friction-rollers to a metallic hub for wagons, &c.

Like letters of reference indicate corresponding parts in each figure.

In the drawing, the letter A designates a pipe or axle box, the bearing-surface of which is constructed so as to receive the journal of the axle, preferably such axles as are termed "swelled half patent." This pipe or axle box is cast or formed in one piece, with a rear disk or flange, B, having a groove, a, provided with a stud or lug, b, and with a screw-thread, c, to receive a front screw-cap or hub-band, C. D is a disk, formed with a central opening, E, so as to surround loosely, but true and closely, the pipe or axle box A, and with a laterally-projecting flange, F, provided with a recess, e, which flange F fits into the groove a, the recess e being of a size just sufficient to receive the lug or stud b and interlock, so as to prevent the said disk D from turning or rotating on the pipe-box, which is an important feature of the invention. This disk has a smooth uninterrupted face-surface, f, against which the inner edges of the spokes abut, and it is provided with a series of openings, d d, through which bolts pass to receive screw-nuts for confining in place a metallic disk carrying a series of diamond-shaped wedges. G designates the metallic disk, having a central opening, g, and a plain smooth surface, h, on one side, while on the other is arranged a series of diamond-shaped wedges, H, some or all of which are provided with projecting screw-lugs or extensions i, which pass through the openings d in the disk D, and receive screw-nuts j, by which means the two disks D and G are connected together and adjusted. The diamond-shaped wedges H form the most important and essential feature of my invention. By the employment of such I am enabled to secure the spokes of a wheel in place in an easy, reliable, effectual, and true position in respect to the other portion of the wheel, and by means of their bearing-surfaces all lateral movement inward and outward is prevented, hence dishing of the wheel overcome, which heretofore has been a serious and injurious objection to such an extent as to embarrass and render almost useless the employment of solid metal hubs. By the employment of the diamond-shaped wedges and the spokes tenoned correspondingly a further advantage is secured, inasmuch as that the spokes are prevented from working loose radially outward, whereby all cutting of the fellies or binding of the wheel is obviated. I find it most practical to form all the bearing-surfaces of the diamond-shaped wedges larger at their base l than at their top or edge m, causing each diamond-shaped wedge to gradually decrease in thickness in cross-section from the bottom to the top, so that an incline is formed. The spokes to be inserted into the spaces between these wedges are grooved on both sides, so as to correspond in outline to the form of the wedges, and are larger than the space designed for their reception, so that when arranged in position, as in Fig. 9, considerable lateral pressure is required to force them down into their respective seats. Each of the spaces being supplied with a spoke, the disk is placed upon the pipe or axle box, the lugs or extensions i i passed through the openings d d, the nuts adjusted and screwed up, causing the two disks to approach each other, thus uniformly pressing each spoke in its place. The smooth-face portion f of the disk D, when united with the disk G and the spokes, always bears upon or is contiguous to the spokes, so that should the spokes become loose, by expansion and contraction during usage or while stored away, they can be tightened by screwing up the nuts j, which object would be defeated if the edges of the metal diamond-shaped wedges came in contact with the metal disk D.

When the parts, as above set forth, have been adjusted upon the pipe or axle box, the front cap I is also placed upon the same, and the whole confined thereon by means of a screw-cap, nut, or hub-band, C, having either an open or closed front. The journal of the axle is confined in the pipe or axle box by a nut, K, of such a size as not to interfere with the outside hub-cap C, in the usual manner.

In Fig. 10 is shown a pipe or axle box cast in one piece, with the back portion B similar to that shown in Fig. 2, only that the diameter of the pipe or axle box is of increased size, so as to receive and apply to carriage-wheels the arrangement of anti-friction rollers described in Letters Patent No. 117,217, granted to me July 18, 1871.

Having thus described my invention, what I claim as new, and desire to secure by Letters Patent, is—

1. A metal disk provided on one side only with a series of diamond-shaped wedges for receiving spokes correspondingly grooved, substantially as herein shown, for the purpose set forth.

2. A metal disk provided with diamond-shaped wedges carrying screw-lugs or extensions i i, substantially as specified.

3. A pipe or axle box formed with the portion B, having the groove a and stud or lug b, for the purpose set forth.

4. A sliding disk, D, of a metal hub formed with a lateral flange, F, having a recess, e, for the purpose specified.

5. The spokes of a carriage-wheel grooved and arranged between diamond-shaped wedges H, substantially as shown, in combination with two disks, D G, arranged upon an axle-box, and connected together by screw-bolts, substantially as set forth.

6. A metallic hub, composed of a pipe or axle box, A, cast with the portion B, having the groove a and stud b, in combination with the sliding and connecting disks D G, a cap, I, and a screw-cap, C, and with diamond-shaped wedges for receiving corresponding grooved spokes, substantially as described.

To the above I have signed my name this 28th day of February, A. D. 1872.

SYLVESTER T. F. STERICK.

Witnesses:
S. RIDGWAY KENNEDY,
P. R. COURTNEAY.